United States Patent [19]
Tilse

[11] 3,934,403

[45] Jan. 27, 1976

[54] FIXATION OF DOUBLE CONDUCTING HAIRSPRING

[75] Inventor: Wilhelm Tilse, Birkenfeld, Germany

[73] Assignee: Timex Corporation, Waterbury, Conn.

[22] Filed: Mar. 17, 1975

[21] Appl. No.: 558,753

[30] Foreign Application Priority Data

May 6, 1974 Germany ........................... 2421750

[52] U.S. Cl. ..................................... 58/114; 29/177

[51] Int. Cl.$^2$ .................... G04B 17/06; B23P 13/00

[58] Field of Search .......................... 29/177; 58/114

[56] References Cited

UNITED STATES PATENTS 3,528,237 9/1970 Suard ............................... 58/114 X

*Primary Examiner*—Edith Simmons Jackmon

[57] ABSTRACT

The invention comprises an improved hairspring arrangement having a hairspring fixed in a groove of the hub in such a way that the hairspring protrudes from the groove, and furthermore, the protruding part of the hairspring should carry the electric conductor. The basic conception of the invention makes it possible to fix the hairspring, which has the customary shape of an upright standing metal strip, to the hub in the usual way. Normally one of the front surfaces of the hub is equipped with a straight or ring-shaped notch which reaches to the peripheral area of the hub and into which the inner end of the hairspring is inserted and then is fastened in the hub by deforming the notch-rims. Up to now the chosen depth of the notch was at least equal to the height of the metal strip forming the hairspring. According to the present invention, however, the height of the upright standing and hairspring-forming metal band is chosen larger than the depth of the notch arranged on one of the front surfaces of the hub, so that one longitudinal edge of the hairspring protrudes from the hub. If the electric conductor is then arranged on this longitudinal edge of the hairspring—naturally by inter positioning of an insulation layer, e.g. an insulating adhesive—then only the actual hairspring is contacted by the hub, but not the electric conductor carried by the hairspring.

7 Claims, 7 Drawing Figures

FIXATION OF DOUBLE CONDUCTING HAIRSPRING

BACKGROUND OF THE INVENTION

Figure 1:
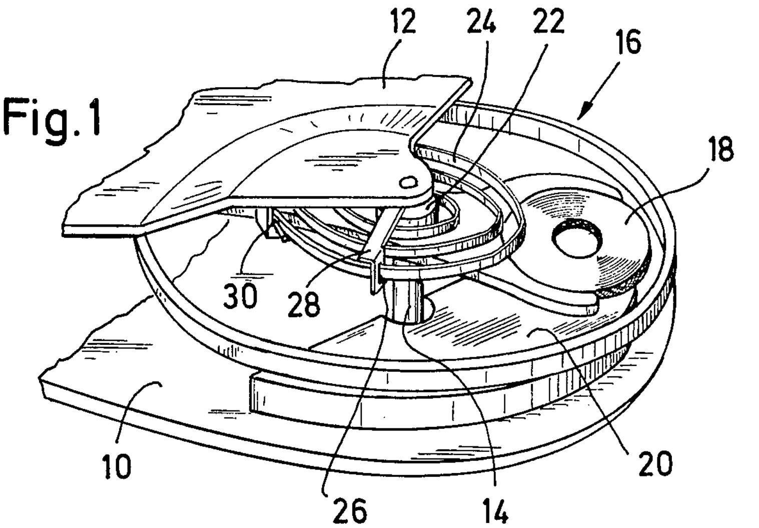

The invention concerns a hairspring arrangement intended in particular for use in electric watches, with a hub and a hairspring, connected to which is an electric conductor extending over at least a part of its length, insulated against the hairspring, the inner end of which is fastened in a groove in the hub.

A hairspring arrangement of the aforementioned type is already known from the German Patent Specification No. 1,078,677, whereby the hairspring is constructed of three flat layers, namely of two electrically conducting strips and an insulating strip arranged between them, connecting both the conductor strips. The hub or hairspring hub consists of an insulating bushing pushed onto the balance wheel axis, and two metallic ring-halves surrounding same, which between them form a slit-shaped groove which takes up the one end of the hairspring, so that the conductor strips thereof come in contact with the ring-halves of the hub which are electrically insulated from each other. This known hairspring arrangement possesses not only the disadvantage of a comparatively complicated hub-construction which requires a considerable time-consuming assembly, but when fastening the hairspring in the hub particular care must be taken that the conductor strips, which one endeavors to construct as thin as possible, are not damaged.

The invention is based on the task of improving the hairspring arrangement of the aforementioned type in such a way, that a simpler construction of the hub and a simpler fixation of the hairspring to the hub is the result. For this purpose it is proposed to fix the hairspring in a groove of the hub in such a way that the hairspring protrudes from the groove, and furthermore, the protruding part of the hairspring should carry the electric conductor. The basic conception of the invention makes it possible to fix the hairspring, which has the customary shape of an upright standing metal strip, to the hub in the usual way; normally one of the front surfaces of the hub is equipped with a straight or ring-shaped notch which reaches to the peripheral area of the hub and into which the inner end of the hairspring is inserted and then is fastened in the hub by deforming the notch-rims. Up to now the chosen depth of the notch was at least equal to the height of the metal strip forming the hairspring, now, according to invention, the height of the upright standing and hairspring-forming metal band is chosen larger than the depth of the notch arranged on one of the front surfaces of the hub, so that one longitudinal edge of the hairspring protrudes from the hub. If the electric conductor is then arranged on this longitudinal edge of the hairspring--naturally by interpositioning of an insulation layer, e.g. an insulating adhesive--then only the actual hairspring is contacted by the hub, but not the electric conductor carried by the hairspring. The invention, therefore, makes it possible to use a hub of simple construction and to manage with the customary production methods and production means. It would also be possible to use a hairspring of different cross-section and to arrange the notch in a different place on the hub, without having to deviate from the basic concept of the invention.

The construction of the hairspring arrangement in accordance with the invention, with a hairspring protruding from a front surface of the hub makes it possible to make an electric contact with the electric conductor of the hairspring in a particularly simple and practical manner; with a preferred type of construction of the invention, a contact element, especially a contact spring, carried by the balance wheel, rests against the electric conductor in the area of the staked, inner hairspring end. When, as is customary with electric watches, the balance wheel carries a coil, then the one end of this can be connected via a contact spring to the electric conductor carried by the hairspring, without having to connect firmly hub and balance wheel. Therefore, the balance wheel can still be moved in relation to the hairspring arrangement, which can be of advantage for adjustment purposes.

Also at the outer end of the hairspring can by analogous use of the basic concept of the invention an electric contact be made very simply to the electric conductor carried by the hairspring: the outer hairspring end fixed to a fastening point protrudes for this purpose at least with the electric conductor from the fastening point, so that no short-circuiting can happen and the electric conductor carried by the hairspring, via a contact element touching the latter, particularly a contact spring, can be connected to a voltage source, e.g. the drive circuit of an electric watch.

The effective length of a hairspring in watches is usually adjusted via an adjustment lever, swiveling around the balance wheel axis, which has a window through which the hairspring extends. In order to prevent a short-circuit between the electric conductor carried by the hairspring and the mass, for instance an insulating adjustment lever of synthetic material could be used, which is unusual, however. It is proposed, therefore, to construct the window of the adjustment lever in such a way, that it widens in the area of the electric conductor of the hairspring, and at least that window-edge-area faced by the electric conductor carries an insulating layer.

DRAWINGS

Figure 2:
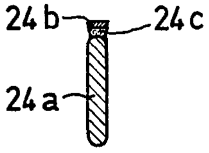
Figure 3:
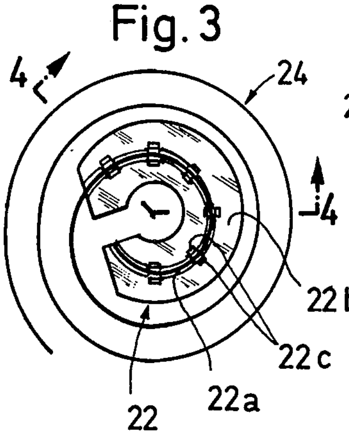
Figure 4:
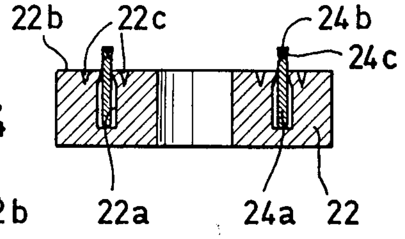
Figure 5:
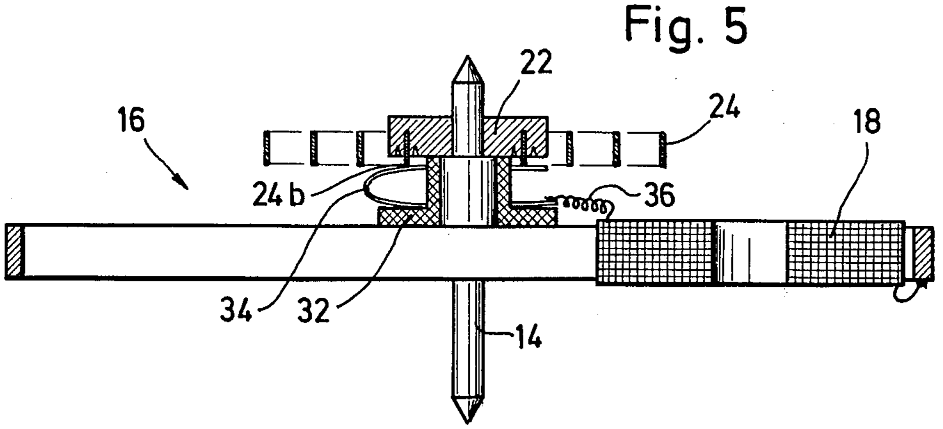
Figure 6:
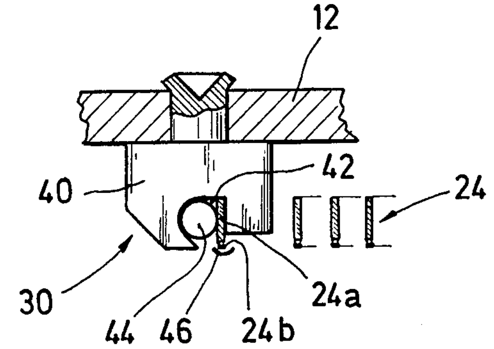

Further characteristics and details of the invention can be seen from the attached graphic representation and the following description of a preferred type of construction of the hairspring arrangement according to invention for use in an electric watch; shown is:

FIG. 1 a perspective representation of a part of an electric wristwatch with balance wheel and hairspring;

FIG. 2 a cross-section through the hairspring and the electric conductor carried by the same;

FIG. 3 a top-view of the hairspring hub or hub and hairspring;

FIG. 4 a section per line 4—4 of FIG. 3;

FIG. 5 an axial section through the central area of the balance wheel and the hairspring arrangement;

FIG. 6 a section through the fixation point of the outer hairspring end and

Figure 7:
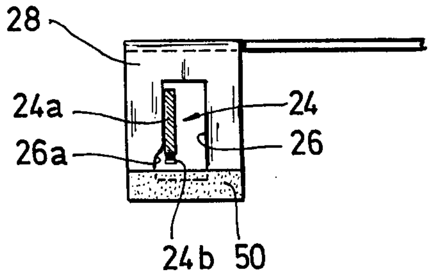

FIG. 7 a side-view of that part of the regulating lever of the watch penetrated by the hairspring. , FIG. 1 shows a part of a front frame 10 as well as a bridge 12 of the work frame of an electric wristwatch in which the axis 14 of a balance wheel in entirety marked 16 is rotary positioned. The latter is of conventional construction and carries an electric coil 18 which cooperates in the usual manner with a permanent magnet 20 fastened on the front frame 10. The axis 14 carries a so-called hairspring hub, i.e. a hub 22 to which the inner end of a hairspring 24 is fastened. The outer end-area of the latter passes through a window 26 of an adjustment lever 28, which is rotary positioned in the bridge 12, coaxially to the axis 14. Rinally, the outer end of the hairspring 24 is fastened at 30 to the bridge 12.

As can be seen from FIG. 2 the hairspring 24 is constructed of an upright standing metal strip 24*a* and a metallic conductor path 24*b* between which is an insulating layer 24*c* preferably of an electrically insulating adhesive. FIGS. 3 and 4 show that the hub 22 has a helical groove 22*a* on its one front surface 22*b*. whereat the depth of this groove is less than the height of the metal strip 24*a* of the hairspring. When placing the inner end of the hairspring into the groove 22*a*, then at least the insulating layer 24*c* and the metallic conductor path 24*b* of the hairspring will protrude from the groove, so that the conductor path is arranged electrically insulated from the hub 22. By placing notches 22*c* at both sides of the groove 22*a* the groove sidewalls will be deformed in such a way that the hairspring is fastened in the groove. This type of fastening is customary, and this in particular represents the essential advantage of the invention, namely that a hairspring, having two electric conductors insulated from each other, can be fastened in the hub in the same way as is customary with conventional constructions.

It can be seen from FIG. 5 how the one end of the coil 18 is in electrically--conductive connection with the conductor path 24*b*. For this purpose on the axis 14 is place an insulating bushing 32 on which a nearly U-shaped contact spring 34 is fastened. With its upper, free-springing leg this touches the metallic conductor path 24*b* of the hairspring, and that in the fastening area of the inner hairspring end, while coil 18 via a lead 36 is connected with the contact spring. The other end of the coil 18 can then be in electrically conductive connection to the balance wheel itself, and thereby to mass.

FIG. 6 shows how the fixation point 30 for the outer hairspring end is constructed: a fastening block 40 riveted in the bridge 12 has a recess 42 of a depth smaller than the height of the metal strip 24*a*. With aid of the pin 44 the hairspring is wedged in this recess. Here too, the metallic conductor path 24*b* protrudes over the fixation point--transverse to the longitudinal direction of the hairspring--so that in a simple way by means of a contact spring 46 an electric connection to the conductor path 24*b* can be made--the contact spring 46 is appropriately fastened and insulated to the bridge 12, which does, however, not follow from the sketch.

Finally, it can be seen from FIG. 7 how the end of the adjustment lever 28 is constructed. The window 26 penetrated by the hairspring 24 widens below that point, where the metal strip 24*a* rests against the window edge, so that due to this widening 26*a* the metallic conductor path 24*b* does not touch the adjustment lever. In order to prevent that, when lowering the hairspring, a short-circuit yet happens, the lower area of that part of the adjustment lever surrounding the window 26 is provided with an insulation layer, in particular a layer of synthetic material 50.

The hairspring arrangement according to invention is naturally suitable not only for electric watches, but for all those devices where a rotary element equipped with a return spring is intended, carrying an electric consumer.

I claim:

1. A conductor-hairspring and hub arrangement for an electric watch comprising:

a hub having a groove;

a hairspring being fastened at one end in said groove and which protrudes from said groove;

means forming an electric conductor affixed on the protruding part of said hairspring and for electrically insulating said electric conductor from said hairspring.

2. Hairspring arrangement with a hub and a hairspring, intended particularly for electric watches, connected with which is an electric conductor extending over at least part of its length, insulated against the hairspring, and the inner end of which is fastened in a groove of the hub, wherein the improvement comprises a hairspring having a protruding part from the groove, and that said protruding part of the hairspring carries said electric conductor.

3. Hairspring arrangement as in claim 2 wherein:

the hairspring has the shape of an upright standing metal strip, the height of which is larger than the depth of the groove which is arranged on one of the front surfaces of the hub.

4. Hairspring arrangement as in claim 2, characterized by the fact that a contact element carried by a balance wheel rests against said electric conductor in the area of the fixed inner hairspring end.

5. Hairspring arrangement as in claim 2 comprising:

means for fastening a outer end of the hairspring with at least the electric conductor protruding therefrom.

6. Hairspring arrangement as in claim 5 wherein: a contact spring touches said electric conductor in the area of said outer end of the hairspring.

7. Hairspring arrangement as in claim 2 wherein:

an adjustment lever for changing the effective length of the hairspring, and having a window means through which the hairspring extends, said window means widens in the area of the electric conductor so that at least that window-edge-area faced by the electric conductor carries an insulation layer.

* * * * *